US012558737B2

(12) United States Patent
Al Qabani et al.

(10) Patent No.: US 12,558,737 B2
(45) Date of Patent: Feb. 24, 2026

(54) BACK PURGING ROBOTIC CRAWLER

(71) Applicant: SAUDI ARABIAN OIL COMPANY, Dhahran (SA)

(72) Inventors: Ali Faraj M. Al Qabani, Dhahran (SA); Muhammed Subhi A. Alnufaili, Dhahran (SA); Saleh Mohammed H. Al Mansour, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 145 days.

(21) Appl. No.: 18/472,023

(22) Filed: Sep. 21, 2023

(65) Prior Publication Data

US 2025/0100067 A1      Mar. 27, 2025

(51) Int. Cl.
B23K 9/00          (2006.01)
B23K 9/32          (2006.01)
(Continued)

(52) U.S. Cl.
CPC ............ B23K 9/326 (2013.01); B23K 31/125 (2013.01); B25J 5/00 (2013.01); B25J 13/006 (2013.01);
(Continued)

(58) Field of Classification Search
CPC ............................ B23K 9/326; B23K 2101/06; B23K 2101/10; B23K 37/0531; B23K 9/16;
(Continued)

(56) References Cited

U.S. PATENT DOCUMENTS 5,583,305 A * 12/1996 Hirsch ............... B23K 37/0531
                                                228/105
8,376,208 B1 * 2/2013 McCarthy ........... F16L 55/1141
                                                219/72
(Continued)

FOREIGN PATENT DOCUMENTS

CN          218503563 U      2/2023
KR          101026176 B1     4/2011
(Continued)

OTHER PUBLICATIONS

KR20170052875A computer translation (Year: 2017).*
(Continued)

*Primary Examiner* — Erin B Saad
(74) *Attorney, Agent, or Firm* — Vorys, Sater, Seymour and Pease LLP

(57) ABSTRACT

A robotic crawler for back purging a weld location in a piping circuit includes a body, one or more conveyors coupled to the body for transporting the robotic crawler within the piping circuit, first and second seal assemblies configured to generate an interference seal with an interior of the piping circuit, a pair of extendable arms, each extendable arm supporting a respective one of the first and second seal assemblies on an opposite side of the body, each respective extendable arm selectively extendable and retractable with respect to the body to adjust a position of the respective seal assembly with respect to the body, and an inert gas flow valve for providing an inert gas into a sealed area defined between the first and second seal assemblies.

20 Claims, 5 Drawing Sheets

(51) Int. Cl.

| | | |
|---|---|---|
| *B23K 31/00* | (2006.01) | |
| *B23K 31/12* | (2006.01) | |
| *B25J 5/00* | (2006.01) | |
| *B25J 13/00* | (2006.01) | |
| *B25J 19/02* | (2006.01) | |
| *F16L 55/26* | (2006.01) | |
| *B23K 101/10* | (2006.01) | |

(52) U.S. Cl.
CPC ............. *B25J 19/023* (2013.01); *F16L 55/26* (2013.01); *B23K 2101/10* (2018.08)

(58) Field of Classification Search
CPC . B23K 31/02; B23K 37/0276; F16L 2101/30; F16L 55/1141; F16L 55/134
See application file for complete search history.

(56) References Cited

U.S. PATENT DOCUMENTS

| | | | | |
|---|---|---|---|---|
| 9,586,284 | B2 * | 3/2017 | Evans ..................... | B23K 9/326 |
| 9,969,031 | B2 * | 5/2018 | Clemmons ......... | B23K 37/0276 |
| 10,189,109 | B2 * | 1/2019 | Evans ..................... | B23K 9/16 |
| 10,201,871 | B2 | 2/2019 | Kadlec | |
| 10,654,122 | B2 * | 5/2020 | Hacikyan ............... | B23K 9/326 |
| 10,695,876 | B2 * | 6/2020 | Rajagopalan ........ | B23K 9/0953 |
| 11,085,885 | B2 * | 8/2021 | Sanchez ................ | B05D 3/002 |
| 2009/0230104 | A1 * | 9/2009 | Domec ................ | C21D 10/005 |
| | | | | 219/121.78 |
| 2011/0210112 | A1 * | 9/2011 | Boatner, Jr. ........... | B23K 31/02 |
| | | | | 29/559 |
| 2012/0201348 | A1 * | 8/2012 | Knight ................ | G01N 23/083 |
| | | | | 378/59 |
| 2013/0284297 | A1 * | 10/2013 | Hacikyan ............... | B23K 9/326 |
| | | | | 138/93 |
| 2014/0326779 | A1 * | 11/2014 | Hacikyan ............... | B23K 9/326 |
| | | | | 228/42 |
| 2015/0034629 | A1 * | 2/2015 | Sherrill .............. | B23K 37/0276 |
| | | | | 219/644 |
| 2015/0083785 | A1 * | 3/2015 | Park ................... | B23K 37/0531 |
| | | | | 228/33 |
| 2016/0221107 | A1 * | 8/2016 | Kadlec ................... | B23K 26/21 |
| 2016/0256961 | A1 * | 9/2016 | Clemmons ............... | B23K 9/16 |
| 2018/0128799 | A1 * | 5/2018 | Hacikyan ........... | G01N 33/0036 |
| 2025/0100067 | A1 * | 3/2025 | Al Qabani ........... | B23K 31/125 |

FOREIGN PATENT DOCUMENTS

| | | |
|---|---|---|
| KR | 20170052875 A | 5/2017 |
| KR | 20190044436 A | 4/2019 |
| KR | 102415586 B1 | 6/2022 |

OTHER PUBLICATIONS

I-Purge Modular Inflatable Bladder System retrieved from https://www.aquasolwelding.com/wp-content/uploads/2022/02/AQU-474. ind_.01-I-Purge-Brochure.pdf.

Purge Plug Purge Tree retrieved from https://www.morganitech.com/industrial-tools/purge-plug-purge-tree/.

Purge Plug Back Purge retrieved from https://www.morganitech.com/industrial-tools/purge-plug-back-purge/.

Purging—GBC UK retrieved from https://gbc-uk.com/product-category/pipe-purging/.

Written Opinion and International Search Report from corresponding PCT Application No. PCT/US2024/045204 mailed Jan. 30, 2025.

* cited by examiner

BACK PURGING ROBOTIC CRAWLER

FIELD OF THE DISCLOSURE

The present disclosure relates generally to robotic welding tools and, more particularly, to systems and methods using a back purging robotic crawler for welding of piping circuits.

BACKGROUND OF THE DISCLOSURE

Welding operations are well-known to be sensitive to environmental and surface conditions, particularly with regards to weld quality. Impurities on a weld surface and high oxygen environments during a weld can lead to imperfect welds that are prone to cracking, leaking, and further deterioration. When externally welding pipe segments, or other hollow materials, the environment within the pipe segments can similarly affect the weld. High oxygen concentrations within a pipe segment can lead to oxidation of the solidifying welded metal and other heat affected zones during thermal cycling. Particularly within piping circuits, oxidation-related weld imperfections can increase a risk of corrosion within the piping joints, including microbial-induced corrosion damage.

Consequently, techniques have been developed to mitigate the effects of oxidation and impurities on the backside of a welded surface. While corrective measures, such as the application of a pickling paste, may be used to repair poor quality welds, back purging can instead prevent oxidation and weld complications from occurring. Back purging involves sealing an internal area of the piping segments to be welded, while replacing the air within the sealed area with an inert gas such that no oxidation may occur. Conventional back purging methods may utilize cardboard, foam, or water-soluble sheets with adhesive tapes to seal the pipe segments and manually introduce inert gas into the sealed area. However, poor seal quality, limited internal access, turbulent gas flow, and a lack of monitoring and inspection are all issues that arise from traditional back purging methods.

Accordingly, systems and methods for automated, remote back purging with flow controls and high-quality sealing are desirable.

SUMMARY OF THE DISCLOSURE

Various details of the present disclosure are hereinafter summarized to provide a basic understanding. This summary is not an exhaustive overview of the disclosure and is neither intended to identify certain elements of the disclosure, nor to delineate the scope thereof. Rather, the primary purpose of this summary is to present some concepts of the disclosure in a simplified form prior to the more detailed description that is presented hereinafter.

According to an embodiment consistent with the present disclosure, a system includes a robotic crawler for back purging a weld location in a piping circuit. The robotic crawler includes a body, one or more conveyors coupled to the body for transporting the robotic crawler within the piping circuit, first and second seal assemblies configured to generate an interference seal with an interior of the piping circuit, and a pair of extendable arms, each extendable arm supporting a respective one of the first and second seal assemblies on an opposite side of the body, each respective extendable arm selectively extendable and retractable with respect to the body to adjust a position of the respective seal assembly with respect to the body. The robotic crawler further includes an inert gas flow valve for providing an inert gas into a sealed area defined between the first and second seal assemblies, a memory storing thereon one or more modules for instructing the one or more conveyors, the pair of extendable arms, the inert gas flow valve, or a combination thereof, and a controller configured to receive instructions from one or more modules of the memory to operate the one or more conveyors, the pair of extendable arms and the inert gas flow valve to control back purging at the weld location.

In another embodiment, a method includes conveying a robotic crawler, via conveyors of the robotic crawler, through a piping circuit and towards a weld location, extending, via one or more arm actuators, a pair of extendable arms of the robotic crawler from a body of the robotic crawler, each extendable arm supporting a respective one of a first and second seal assemblies on an opposite side of the body of the robotic crawler, and generating an interference seal within an interior of the piping circuit, via the first and second seal assemblies of the robotic crawler. The method further includes introducing, via an inert gas flow valve, an inert gas into a sealed area defined between the first and second seal assemblies, releasing, via an oxygen release valve, oxygenated air from the sealed area into a remainder of the piping circuit, and welding an exterior of the piping circuit while the interior of the piping circuit at the weld location is shielded by the inert gas.

In a further embodiment, a robotic crawler for back purging a weld location in a piping circuit includes a body, one or more conveyors coupled to the body for transporting the robotic crawler within the piping circuit, first and second seal assemblies configured to generate an interference seal with an interior of the piping circuit, a pair of extendable arms, each extendable arm supporting a respective one of the first and second seal assemblies on an opposite side of the body, each respective extendable arm selectively extendable and retractable with respect to the body to adjust a position of the respective seal assembly with respect to the body, and an inert gas flow valve for providing an inert gas into a sealed area defined between the first and second seal assemblies.

Any combinations of the various embodiments and implementations disclosed herein can be used in a further embodiment, consistent with the disclosure. These and other aspects and features can be appreciated from the following description of certain embodiments presented herein in accordance with the disclosure and the accompanying drawings and claims.

DETAILED DESCRIPTION

Figure 1:
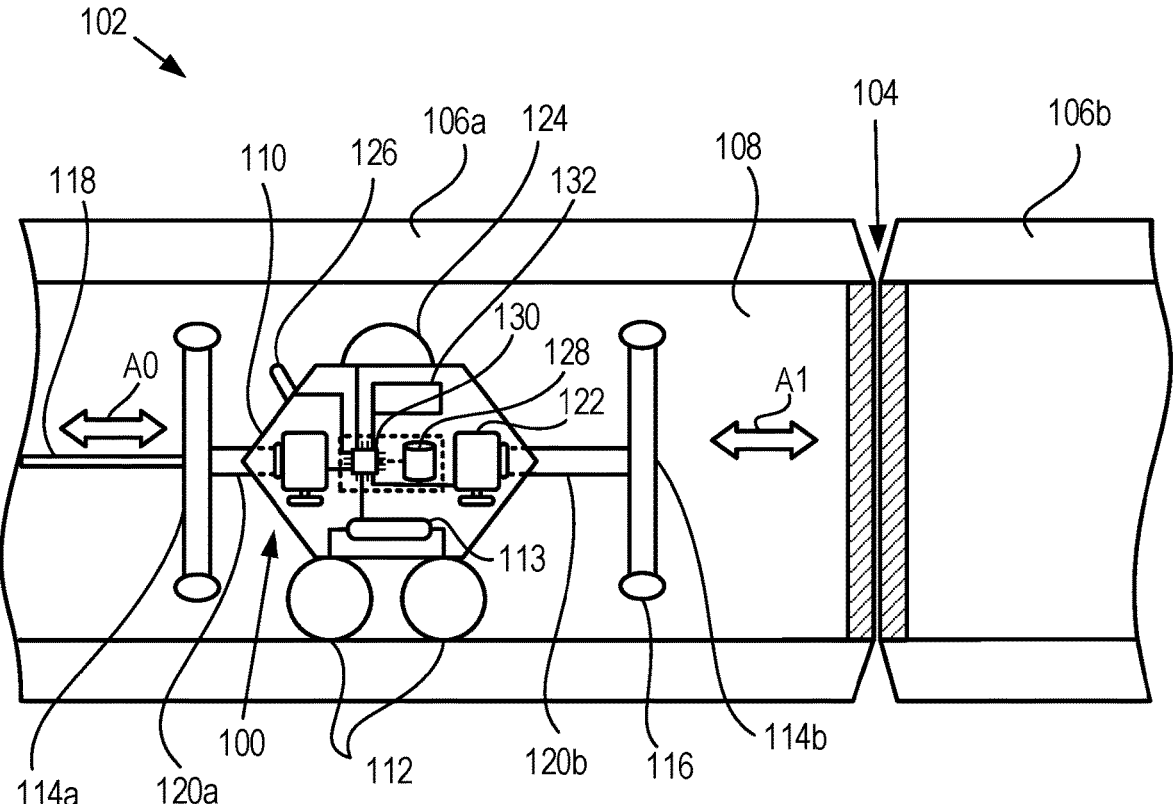
FIG. 1 is a schematic view of robotic crawler being conveyed within a portion of a piping circuit defining a weld location in accordance with one or more principles of the present disclosure.

Embodiments of the present disclosure will now be described in detail with reference to the accompanying Figures. Like elements in the various figures may be denoted by like reference numerals for consistency. Further, in the following detailed description of embodiments of the present disclosure, numerous specific details are set forth in order to provide a more thorough understanding of the claimed subject matter. However, it will be apparent to one of ordinary skill in the art that the embodiments disclosed herein may be practiced without these specific details. In other instances, well-known features have not been described in detail to avoid unnecessarily complicating the description. Additionally, it will be apparent to one of ordinary skill in the art that the scale of the elements presented in the accompanying Figures may vary without departing from the scope of the present disclosure.

Embodiments in accordance with the present disclosure generally relate to robotic welding tools and, more particularly, to a back purging robotic crawler for welding of piping circuits. The embodiments disclosed herein include systems, apparatuses, and methods for automated back purging of a weld location within a piping circuit. These embodiments include conveying the robotic crawler, establishing an inflatable seal, controlling and monitoring conditions within a sealed area, and maintaining optimal welding conditions before and during the welding operation. The embodiments disclosed herein may enable active monitoring and control by software or modules for automated inert gas flow control and oxygen concentration to prevent oxidation and corrosion. High-resolution, 360° cameras may be employed by the robotic crawler to monitor and inspect the weld quality and color during and after a welding operation. The robotic crawler may be able to traverse lengthy pipe circuits to reach a weld location and can aid in creating permanent records of weld environments and corresponding qualities. The sealing assemblies may enable fast and simple seal generation while maintaining an impermeable barrier for sealing the weld location. Using the embodiments disclosed herein, optimally back-purged weld environments (e.g., 0.05% oxygen concentration or lower) may be generated and maintained in an automated and efficient process without turbulence or oxidation.

FIG. 1 is a schematic view of robotic crawler 100 being conveyed within a portion of a piping circuit 102 defining a weld location 104, in accordance with one or more principles of the present disclosure. The piping circuit 102 may include a plurality of piping segments 106*a,b* (or lengths of pipe) that form the piping circuit 102 for fluid transport. In some embodiments, the piping segments 106*a,b* may be formed of corrosion-resistant alloys (CRAs), such as stainless steels alloyed with Chromium, Nickel and/or Molybdenum and other alloys utilized in oil and gas operations. Accordingly, in some embodiments, the piping circuit 102 may form part of a downhole operation or other oil and gas system. During construction of the piping circuit 102, the piping segments 106*a,b* may be welded together to form a resilient seal at an interface between the axially adjacent piping segments 106*a,b*. In the illustrated embodiment, a weld location 104 has been prepared between the piping segments 106*a,b* with an external groove to facilitate a welding operation between external surfaces of the piping segments 106*a,b*. However, to ensure a quality weld between the piping segments 106*a,b*, back purging may be implemented within an interior 108 of the piping circuit 102. Back purging within the interior 108 of the piping segments 106*a,b* at the weld location 104 may reduce or prevent oxidation, microbial damage, and corrosion from occurring within the weld.

Accordingly, the robotic crawler 100 may be deployed within the interior 108 of the piping circuit 102. The robotic crawler 100 may include a body 110 having one or more conveyors 112 mounted thereto and actuatable to allow the robotic crawler 100 to traverse any length of piping circuit 102 to arrive at or near the weld location 104. In the illustrated embodiment, the conveyors 112 are motorized wheels, driven by a conveyor actuator 113, used to drive the robotic crawler 100 within the interior 108 of the piping circuit 102. Those skilled in the art will readily appreciate, however, that the conveyors 112 could alternatively (or in addition thereto) further include one or more track and wheel sets or actuatable leg pairs, without departing from the scope of this disclosure.

The conveyors 112 may enable the robotic crawler 100 to reach the weld location 104 in order to deploy a plurality of seal assemblies including first and second seal assemblies 114*a* and 114*b*. The seal assemblies 114*a,b* may be utilized in sealing the interior 108 of the piping circuit 102 on either side of the weld location 104. The seal assemblies 114*a,b* may thereby establish a sealed area 302 (FIG. 3) in which the environment may be controlled. For example, an inert gas, or "shielding gas", may be injected between the seal assemblies 114*a,b* to replace oxygenated air on the backside of the weld location 104.

Figure 3:
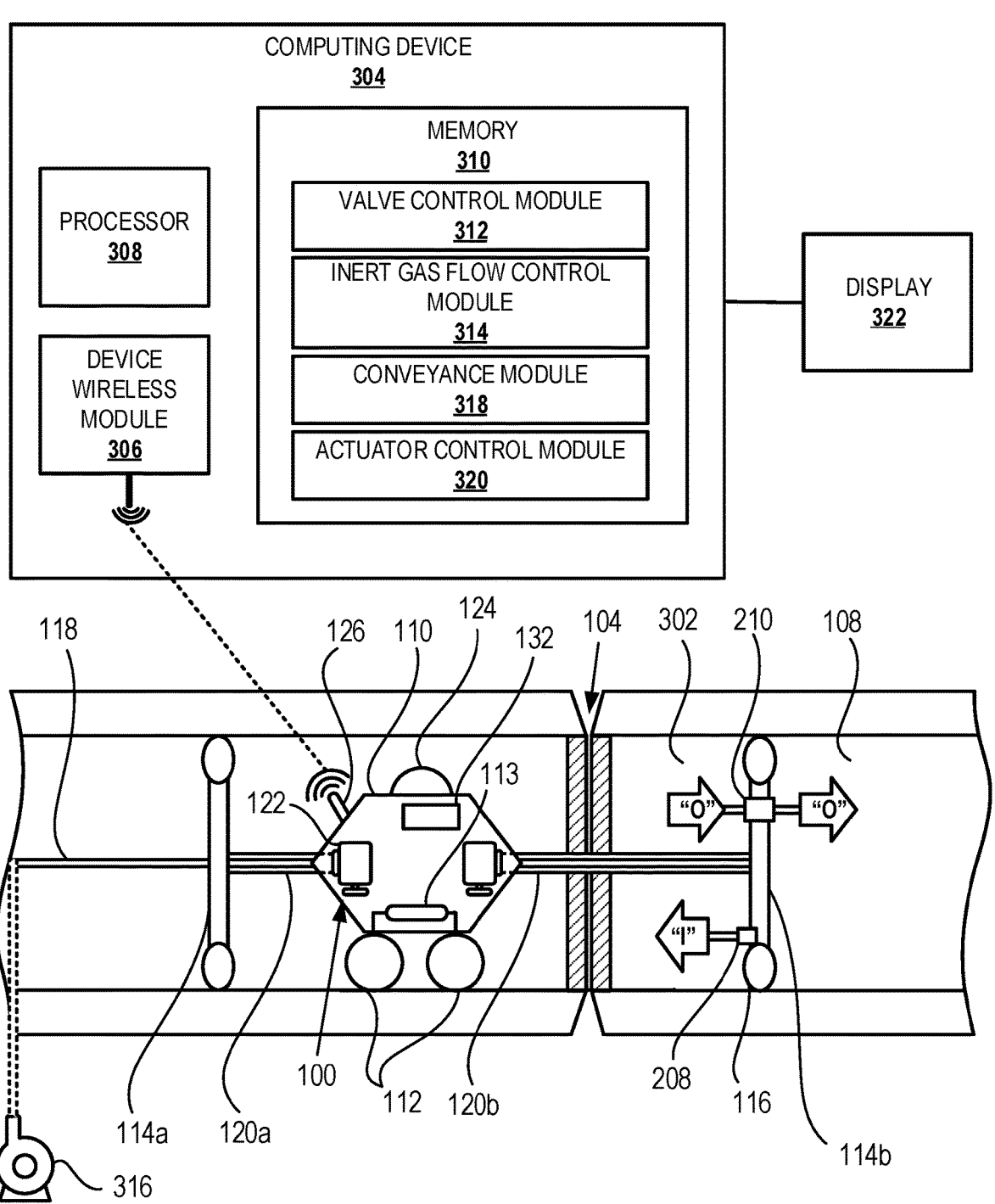
FIG. 3 is a schematic view of the robotic crawler in a deployed state within the interior of the piping circuit.

The seal assemblies 114*a,b* may each include one or more inflatable seal members 116 which are elastically expandable to seal across the inner diameter of the interior 108 of the piping segments 106*a,b*. The inflatable seal members 116 are shown in FIG. 1 as uninflated during conveyance of the robotic crawler 100 the weld location 104. Once the robotic crawler 100 reaches the weld location, as shown in FIG. 3, the inflatable seal members 116 may be inflated. The inflatable seal members 116 may be formed of an elastic material, such as a rubber, latex, neoprene, or a combination thereof. In some embodiments, the elastic material may be chosen for the specific application based upon the applied temperatures, desired durability, and sealing effectiveness.

In some embodiments, the inflatable seal members 116 may be inflated using the inert gas to be later supplied within the sealed area. A gas delivery tube 118 may be in fluid communication with the robotic crawler 100 to provide inert gas to one or more components of the robotic crawler 100. Accordingly, the gas delivery tube 118 may be in fluid communication with the first and second seal assemblies 114*a,b*. The gas delivery tube 118 may be fluidly coupled to a gas source (not shown) external to the piping circuit 102, such that an inert gas (e.g., Argon, Helium, or a combination thereof) can be provided to the interior 108 of the piping circuit 102.

In some embodiments, the seal assemblies 114*a,b* may each be positioned on an end of a corresponding extendable arm 120*a,b*. The extendable arms 120*a,b* are illustrated in FIG. 1 in a retracted position with respect to the body 110 of the robotic crawler 100, as the robotic crawler 100 may be compacted during conveyance. The robotic crawler 100 may include one or more arm actuators 122, such as an electric motor, which can extend and retract the extendable arms 120*a,b* with respect to the body 110. The arm actuators 122 may accordingly extend the extendable arms 120*a,b* in direction "A0" and retract the extendable arms 120a,b in direction "A1". Upon reaching an area near to the weld location 104, the robotic crawler 100 may extend one or both of the extendable arms 120a,b from the body 110 to expand the sealed area 302 that may be established around the weld location 104. This larger area around the weld location 104 may enable the robotic crawler 100 to back purge within the interior 108 of the piping circuit 102 while maintaining the various components of the robotic crawler 100 at a safe distance from the weld location 104. Accordingly, the robotic crawler 100 may be less directly exposed to sparks and heat from the welding process while maintaining a back purge.

Further, the seal assemblies 114a,b and extendable arms 120a,b may be constructed in dissimilar or different shapes or sizes, such that the robotic crawler 100 may be deployed in a variety of piping circuits, including, e.g., piping circuits with mismatched piping segments 106a,b. In some embodiments, the inflatable seal members 116 may be variably inflated, e.g., to differing sizes or pressures, to provide an air-tight interference fit regardless of the internal diameter of the piping segments 106a,b.

During conveyance and operation of the robotic crawler 100, a field of view within the interior of the piping circuit 102 may be provided by a camera 124 that is integrated into, or otherwise carried by, the body 110 of the robotic crawler 100. In some embodiments, the camera 124 may be a high-resolution, 360° camera which can enable directional focusing of the camera 124, e.g., for verifying proper positioning of the robotic crawler 100 with respect to the weld location 104 and inspection of an internal weld bead (not shown) generated by the welding operation. In some embodiments, the camera 124 may include or incorporate infrared cameras for determining weld temperature and for monitoring cooling of the weld bead. The camera 124 may inspect the weld bead for discoloration or oxidation of both the internal weld bead and a surrounding heat-affected zone.

The camera 124 may be operably coupled to a crawler wireless module 126 integrated into, or otherwise carried by the robotic crawler 100. The crawler wireless module 126 may include a transmitter and/or a receiver to facilitate wireless communication between the camera 124 and a remote operator's device such as a computing device 304 (FIG. 3) as described in greater detail below. Thus, images or video captured by the camera 124 may be remotely viewed by an operator at a display 322 (FIG. 3) or another operator's device as described in greater detail below. Further, the crawler wireless module 126 may enable receiving commands and controls from the operator's device to drive the conveyors 112, manipulate the camera 124, or operate the robotic crawler 100, seal assemblies 114a,b, and arm actuators 122 from an external location.

Any commands received via the crawler wireless module 126, and any images or videos captured by the camera 124, may be stored in a memory 128 within the body 110 of the robotic crawler 100. The memory 128 may be a computer-readable medium which can store electronic signals, instructions, and information, such that the robotic crawler 100 may include on-board storage. The memory 128 may be coupled to a controller 130 for performance of (executing) the instructions and for controlling operation of the robotic crawler 100. In some embodiments, the controller 130 may be a processor for complex tasks and real-time updating. In these embodiments, the memory 128 may include gas flow control software to be utilized by the controller 130. In further embodiments, however, the memory 128 and controller 130 may be in communication with an external device for running gas flow control software and providing control signals to the robotic crawler. As such, the robotic crawler 100 may incorporate or otherwise include one or more sensors 132 for monitoring conditions within the sealed area 302 (FIG. 3). The one or more sensors 132 may be in further communication with the crawler wireless module 126, as well as the memory 128 and controller 130.

Figure 2:
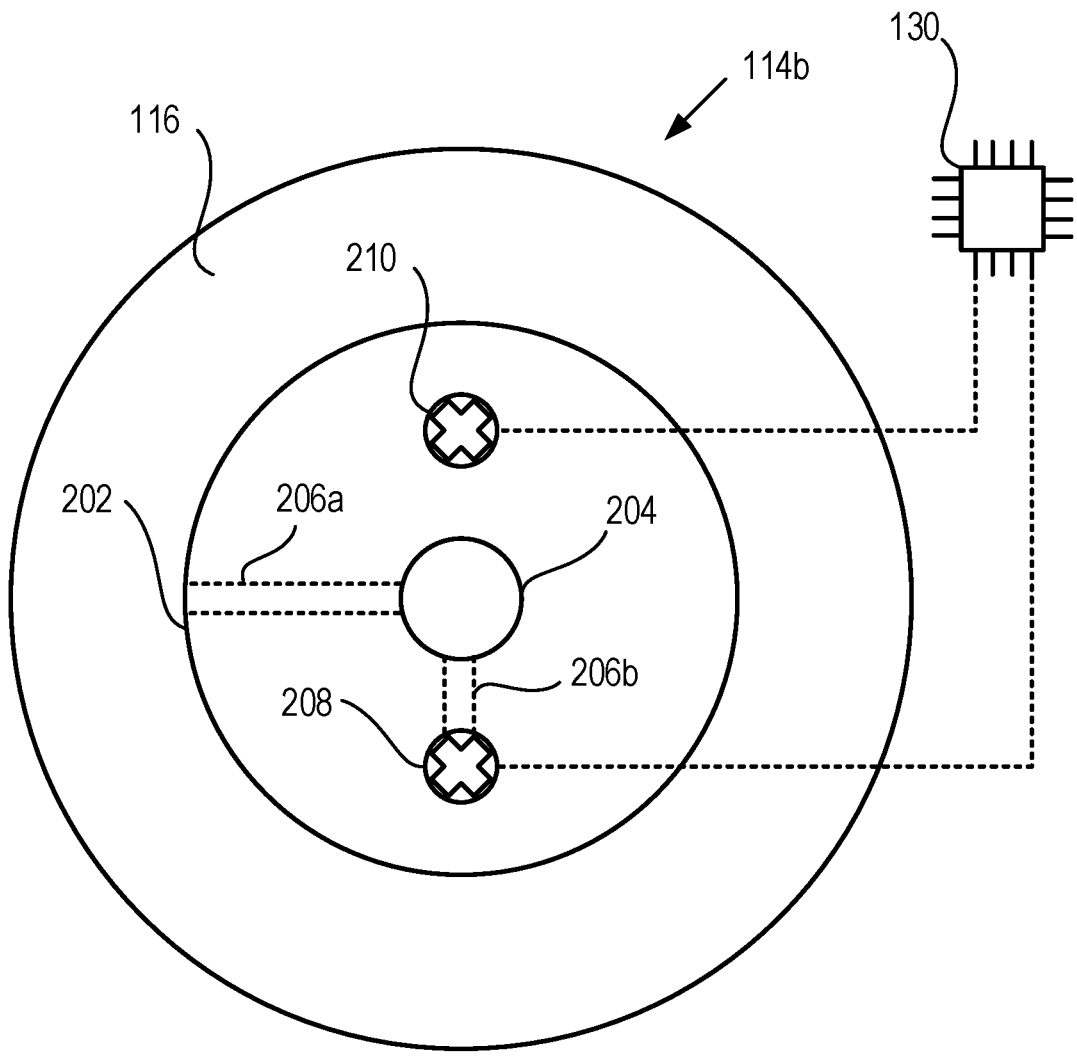
FIG. 2 is a schematic side view of a second seal assembly of the robotic crawler of FIG. 1, according to at least one embodiment of the present disclosure.

FIG. 2 is a schematic end view of the second seal assembly 114b, according to at least one embodiment of the present disclosure. The second seal assembly 114b may include a central plate 202 which may be constructed of a substantially rigid material such as a metallic material. The central plate 202 may include a central aperture 204, which receives the extendable arm 120b of the robotic crawler 100 (FIG. 1). One or more flow paths 206a,b may extend through the central plate 202 radially outward from the central aperture 204. An inert gas flow valve 208 may be included within the central plate 202, and the one or more flow paths 206a,b may extend to the inflatable seal member 116 and the inert gas flow valve 208 to provide the inert gas. Similar flow paths 206a,b may be further included in the first seal assembly 114a of FIG. 1. In some embodiments, the inert gas flow valve 208 is operatively connected to the controller 130 to enable active control of the inert gas flow valve 208. In alternate embodiments, however, the inert gas flow valve 208 may include a pressure control valve to permit flow therethrough once a predetermined set pressure is reached.

After inflation of the inflatable seal member 116, the inert gas may flow to the inert gas flow valve 208. The inert gas flow valve 208 may enable the flow of inert gas into the sealed area 302 (FIG. 3) created by the robotic crawler 100 of FIG. 1. An oxygen release valve 210 may be further included within the central plate 202, and may be operatively connected to the controller 130 to selectively enable one-way flow through the central plate 202. In other embodiments, the oxygen release valve 210 may include a passive check valve to permit one way fluid flow through the central plate 202 in an opposite direction of the flow through inert gas flow valve 208.

FIG. 3 is a schematic view of the robotic crawler 100 in a deployed state within the interior 108 of the piping circuit 102. The robotic crawler 100 has been positioned at or near the weld location 104. The extendable arms 120a,b have been extended axially away from the body 110 such that the weld location 104 is arranged (interposed) between the seal assemblies 114a,b. The gas delivery tube 118 extends through the extendable arms 120a,b and through the body 110 of the robotic crawler 100. With the extendable arms 120a,b in position, the gas delivery tube 118 may provide inert gas to the inflatable seal members 116. In the illustrated embodiment, the inflatable seal members 116 have expanded to engage and form an interference fit against the inner diameter of the interior 108 of the piping circuit 102. Accordingly, a sealed area 302 has be created between the seal assemblies 114a,b and the sealed area 302 includes the weld location 104.

The sealed area 302 may initially include atmospheric, oxygenated air ("O") which can cause oxidation of a weld bead (not shown) to be formed at weld location 104. Oxidation could undesirably lead to degradation of the piping circuit 102. Accordingly, excess inert gas ("I") may be introduced to the sealed area 302 to displace the oxygenated air "O." The inert gas "I" may be introduced through the inert gas flow valve 208, e.g., once the controller 130 instructs the inert gas flow valve 208 to open and/or a valve set pressure of the inert gas flow valve 208 has been achieved. As the inert gas "I" enters the sealed area 302, the oxygenated air "O" may be displaced. In some embodiments, pressure increases within the sealed area 302 may enable opening of the oxygen release valve 210, such that the gaseous mixture within the sealed area 302 may be released into the remainder of the piping circuit 102. The sensors 132 may include one or more gas analyzers which are configured to monitor oxygen levels inside of the sealed area 302.

In some embodiments, a computing device 304 may be communicatively coupled to the robotic crawler 100 via the crawler wireless module 126. The computing device 304 may be disposed external to the piping circuit 102 and utilized by an operator in the back purging operation, and may include a device wireless module 306 for receiving and transmitting signals to the crawler wireless module 126. As illustrated in FIG. 3, the device wireless module 306 is a component of the computing device 304, and the computing device 304 may be operated nearby, e.g., within a wireless communication range. In other embodiments, the device wireless module 306 may be external to the computing device 304 and may be in communication with the computing device 304 over internet, phone, or other long-range communication networks. The computing device 304 may include a processor 308 for manipulating received signals from the one or more sensors 132 and running one or more programs stored within connected memory 310. The memory 310 may be a computer-readable medium storing thereon programs or instructions for operation of the robotic crawler 100. The memory 310 may further include storage modules for maintaining a permanent record of the weld operations with images and/or videos.

In some embodiments, the memory 310 includes a valve control module 312 which utilizes data provided by the robotic crawler 100 to automatically instruct the crawler 100 to open and close the inert gas flow valve 208 and the oxygen release valve 210 in response to a predetermined set of conditions during operation. The computing device 304 may receive an indication that the sealed area 302 has been successfully created, and may then begin valve operation using the valve control module 312. Further, the memory 310 may include an inert gas flow control module 314. Using readings from the one or more sensors 132, the computing device 304 may transmit instructions to the controller 130 for operating the inert gas flow valve 208 to adjust toward an open or closed position to control the flow rate of the inert gas "I" entering the sealed area 302.

The sensors 132 may determine a concentration of oxygenated air "O" within the sealed area 302, and may fine-tune the flow rate of the inert gas "I" to displace and replace the oxygenated air "O". The inert gas flow control module 314 may further transmit instructions for the inert gas flow valve 208 to automatically adjust the flowrate of the inert gas "I" in response to a predetermined set of conditions indicative of turbulence or high pressures within the sealed area 302 which can negatively impact the weld quality. Further, the inert gas flow control module 314 may generate instructions for control of an upstream pump 316 which provides inert gas "I" to the gas delivery tube 118. As such, the inert gas flow control module 314 may further control the flowrate of the inert gas "I" reaching the robotic crawler 100.

The instructions stored within the memory 310 may be utilized by the processor 308 in the initial back purging of the weld location 104, as well as maintaining optimal gas qualities during the weld operation. Through active monitoring of conditions within the sealed area 302, as well as direct control over the inert gas flow valve 208, oxygen release valve 210, and flow rate of inert gas "I", the computing device 304 can ensure an optimal weld environment (such as a maximum 0.05% concentration of oxygen).

In some embodiments, the memory 310 may further include a conveyance module 318. The conveyance module 318 may generate instructions for the controller 130 to manipulate or actuate the conveyors 112 or the conveyor actuator 113. The conveyance module 318 may accordingly enable remote or autonomous control of the conveyance for the robotic crawler 100 during operation. In some embodiments, the memory 310 includes an actuator control module 320. The actuator control module 320 may generate instructions for operation of the one or more arm actuators 122 to control extension or retraction of the extendable arms 120*a*, *b*. The actuator control module 320 may enable remote or autonomous control of the motion of the extendable arms 120*a,b* to increase a size of the sealed area 302 or to translate the robotic crawler 100 therein.

During, and after the welding process, the camera 124 may inspect the weld bead from the sealed area 302 behind the weld location 104. The camera 124 may transmit images or videos to the computing device 304, and the images or videos may be output onto a display 322. The display 322 may be in wired or wireless communication with the computing device 304, or the robotic crawler 100 directly, such that an operator can visually monitor the weld. The camera 124 and the display 322 may enable an operator to check for discoloration, cracking, improper weld bead shape, and general quality of the weld. Operations within the sealed area 302 may generate heat and sparks near the weld location 104, and proper shielding and resistances may be used to withstand the potentially harmful environment. In some embodiments, the body 110 and the extendable arms 120*a,b* of the robotic crawler 100 may be coated in spark and heat resistant materials to withstand a close proximity to the weld location 104. In some embodiments, the body 110 and the extendable arms 120*a,b* may be covered in a heat-resistant fabric, such as a fiberglass or ceramic fiber, for protection from welding heat, sparks, and molten metal.

Figure 4:
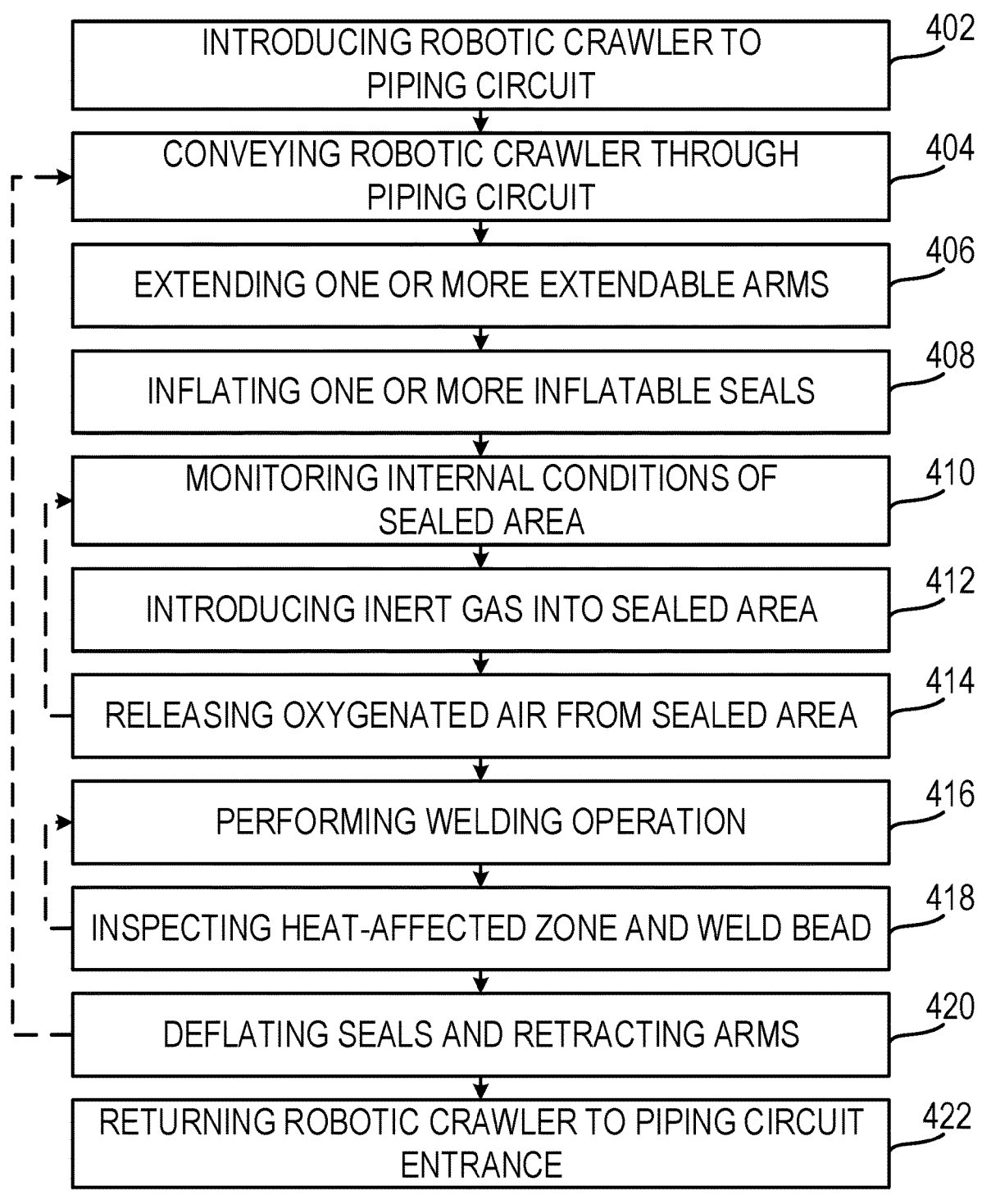
FIG. 4 is a flowchart illustrating an example of a method for welding a piping circuit including back purging a weld location within the piping circuit.

FIG. 4 is a schematic flowchart of an example method 400 for forming a weld at a weld location within a piping circuit and back purging the weld location to enhance a quality of the weld. The method 400 can be implemented using the robotic crawler 100 and computing device 304, as shown in FIGS. 1-3. Thus, the method 400 may be best understood with reference to the examples of FIGS. 1-3. The method 400 may begin at 402 with introducing a robotic crawler (e.g., the robotic crawler 100) into a piping circuit (e.g., the piping circuit 102). The robotic crawler may be placed at an accessible entrance to the piping circuit, such that the weld location (e.g., the weld location 104) is eventually reachable from the piping circuit entrance. The method 400 may continue at 404 with conveying the robotic crawler to the weld location through the piping circuit. The conveying of the robotic crawler at 404 may be performed via one or more conveyors (e.g., the conveyors 112) which enable motion of the robotic crawler through the piping circuit. Conveying the robotic crawler at 404 may further include driving of the robotic crawler via an external computing device (e.g., the computing device 304) and a camera (e.g., the camera 124) integrated into the robotic crawler. Images of the camera may be transmitted from a crawler wireless module (e.g., the crawler wireless module 126) to a device wireless module (e.g., the device wireless module 306) of the computing device, while instructions may be transmitted in the reverse direction.

The robotic crawler may be conveyed through the piping circuit until the robotic crawler is at or near the weld location. The method 400 may continue at 406 with extending one or more extendable arms (e.g., the extendable arms 120*a,b*) of the robotic crawler. Each of the one or more extendable arms may include a seal assembly (e.g., the seal assembly 114*a,b*) positioned at or near a distal end of each extendable arm. The extending of the extendable arms at 406 may continue until the weld location is interposed between the two seal assemblies, such that the area around the weld location may be isolated from the remainder of the piping circuit. The method 400 may continue at 408 with inflating an inflatable seal member (e.g., the inflatable seal member 116) of each seal assembly. In some embodiments, inflating the inflatable seal member at 408 is performed via pumping inert gas to the seal assemblies, such that the same shielding gases may be used for establishing a seal. The inflating of the inflatable seal members may generate a sealed area (e.g., the sealed area 302) around the weld location, and isolated from the remainder of the piping circuit.

The method 400 may continue at 410 with monitoring internal conditions within the sealed area via one or more sensors (e.g., the one or more sensors 132). The internal conditions may include the oxygenated air concentration within the sealed area, the inert gas concentration within the sealed area, air velocity/turbulence, and thermal measurements within the sealed area. In some embodiments, the monitoring at 410 may be performed within a processor (e.g., the controller 130) and a memory (e.g., the memory 128) within the robotic crawler. In alternate embodiments, however, the monitoring at 410 may be performed by the computing device in communication with the robotic crawler. The method 400 may continue at 412 with introducing inert gas into the sealed area via an inert gas flow valve (e.g., the inert gas flow valve 208). Introducing the inert gas into the sealed area may increase pressures in the sealed area, as the inert gas is added to the oxygenated atmospheric air. Accordingly, the method 400 may continue at 414 with releasing oxygenated atmospheric air via an oxygen release valve (e.g., the oxygen release valve 210). The introduction of inert gas at 412 and release of oxygenated atmospheric air at 414 may be performed simultaneously, or in an alternating manner, to prevent high pressure within the sealed area while replacing the oxygenated atmospheric air with a shielding inert gas. In some embodiments, the monitoring of internal conditions at 410 may be additionally performed simultaneously to the introduction of inert gas at 412 and the release of oxygenated atmospheric air at 414, such that the computing device may automatically control all three operations. In further embodiments, however, the method 400 may loop through 410, 412, and 414 until the oxygen level is effectively controlled and the sealed area is shielded with inert gas.

The method 400 may continue at 416 with performing a welding operation on the welding location on the external section of the piping segments (e.g., the piping segments 106*a,b*). During the welding operation at 416, the conditions in the sealed area may continue to be monitored and controlled to ensure an optimal welding environment. The method 400 may continue at 418 with inspecting a heat-affected zone and the weld bead during and after the welding operation. The robotic crawler may transmit images and/or videos from the camera to the computing device for visualization on a display (e.g., the display 322). The weld bead color and quality may be monitored to ensure no oxidation, overheating, or cracking has occurred during the welding process. Inspecting the heat-affected zone and weld bead may include conveying a body of the robotic crawler (e.g., the body 110) within the sealed area to re-position the camera and view the weld bead from additional positions. For example, the conveyor may convey the body while appropriately extending and retracting the arms to move the body with respect to the seal assemblies. If any deficiencies are identified, the method may return to step 416 to correct the weld before proceeding with additional steps of the method 400.

Once the quality of the weld bead has been verified, the method 400 may continue at 420 with deflating the inflatable seal members and retracting the extendable arms. Following inspection at 418, the weld may be allowed to cool prior to unsealing the sealed area and collapsing the robotic crawler, so that the weld integrity can be maintained. Once the weld is sufficiently cooled and inspected, the robotic crawler may be prepared for further transport. In some embodiments, the method 400 may continue at 422 with returning the robotic crawler to the piping circuit entrance for extraction. In further embodiments, however, the method 400 may loop back to 404, such that the robotic crawler may advance to a further weld location and begin a back purging operation between further pipe segments. In this way, the method 400 and robotic crawler are reusable to weld and seal the entire piping circuit in succession, without a need to reload, repair, or replace components of the robotic crawler.

In view of the foregoing structural and functional description, those skilled in the art will appreciate that portions of the embodiments may be embodied as a method, data processing system, or computer program product. Accordingly, these portions of the present embodiments may take the form of an entirely hardware embodiment, an entirely software embodiment, or an embodiment combining software and hardware, such as shown and described with respect to the computer system of FIG. 5. Furthermore, portions of the embodiments may be a computer program product on a computer-readable storage medium having computer readable program code on the medium. Any non-transitory, tangible storage media possessing structure may be utilized including, but not limited to, static and dynamic storage devices, volatile and non-volatile memories, hard disks, optical storage devices, and magnetic storage devices, but excludes any medium that is not eligible for patent protection under 35 U.S.C. § 101 (such as a propagating electrical or electromagnetic signals per se). As an example and not by way of limitation, computer-readable storage media may include a semiconductor-based circuit or device or other IC (such, as for example, a field-programmable gate array (FPGA) or an ASIC), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, or another suitable computer-readable storage medium or a combination of two or more of these, where appropriate. A computer-readable non-transitory storage medium may be volatile, nonvolatile, or a combination of volatile and non-volatile, as appropriate.

Certain embodiments have also been described herein with reference to block illustrations of methods, systems, and computer program products. It will be understood that blocks and/or combinations of blocks in the illustrations, as well as methods or steps or acts or processes described herein, can be implemented by a computer program comprising a routine of set instructions stored in a machine-readable storage medium as described herein. These instructions may be provided to one or more processors of a general purpose computer, special purpose computer, or other programmable data processing apparatus (or a combination of devices and circuits) to produce a machine, such that the instructions of the machine, when executed by the processor, implement the functions specified in the block or blocks, or in the acts, steps, methods and processes described herein.

These processor-executable instructions may also be stored in computer-readable memory that can direct a computer or other programmable data processing apparatus to function in a particular manner, such that the instructions stored in the computer-readable memory result in an article of manufacture including instructions which implement the function specified. The computer program instructions may also be loaded onto a computer or other programmable data processing apparatus to cause a series of operational steps to be performed on the computer or other programmable apparatus to realize a computer implemented process such that the instructions which execute on the computer or other programmable apparatus provide steps for implementing the functions specified in flowchart blocks that may be described herein.

Figure 5:
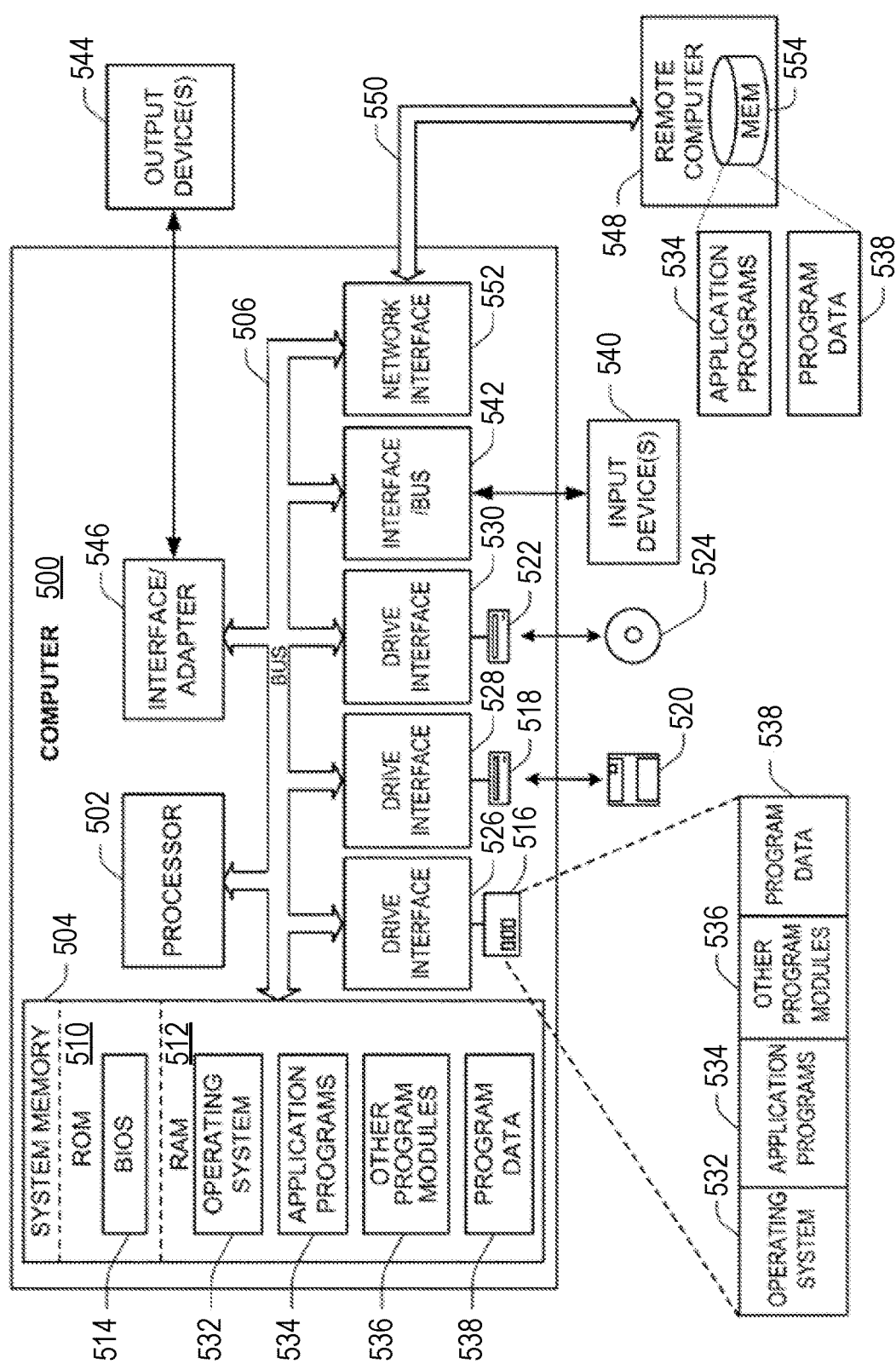
FIG. 5 is a block diagram of a computer system that may be used to implement one or more of the systems or methods described herein in accordance with certain embodiments.

In this regard, FIG. 5 illustrates one example of a computer system 500 that can be employed to execute one or more embodiments of the present disclosure. Computer system 500 can be implemented on one or more general purpose networked computer systems, embedded computer systems, routers, switches, server devices, client devices, various intermediate devices/nodes or standalone computer systems. Additionally, computer system 500 can be implemented on various mobile clients such as, for example, a personal digital assistant (PDA), laptop computer, pager, and the like, provided it includes sufficient processing capabilities.

Computer system 500 includes processing unit 502, system memory 504, and system bus 506 that couples various system components, including the system memory 504, to processing unit 502. System memory 504 can include volatile (e.g. RAM, DRAM, SDRAM, Double Data Rate (DDR) RAM, etc.) and non-volatile (e.g. Flash, NAND, etc.) memory. Dual microprocessors and other multi-processor architectures also can be used as processing unit 502. System bus 506 may be any of several types of bus structure including a memory bus or memory controller, a peripheral bus, and a local bus using any of a variety of bus architectures. System memory 504 includes read only memory (ROM) 510 and random access memory (RAM) 512. A basic input/output system (BIOS) 514 can reside in ROM 510 containing the basic routines that help to transfer information among elements within computer system 500.

Computer system 500 can include a hard disk drive 516, magnetic disk drive 518, e.g., to read from or write to removable disk 520, and an optical disk drive 522, e.g., for reading CD-ROM disk 524 or to read from or write to other optical media. Hard disk drive 516, magnetic disk drive 518, and optical disk drive 522 are connected to system bus 506 by a hard disk drive interface 526, a magnetic disk drive interface 528, and an optical drive interface 530, respectively. The drives and associated computer-readable media provide nonvolatile storage of data, data structures, and computer-executable instructions for computer system 500. Although the description of computer-readable media above refers to a hard disk, a removable magnetic disk and a CD, other types of media that are readable by a computer, such as magnetic cassettes, flash memory cards, digital video disks and the like, in a variety of forms, may also be used in the operating environment; further, any such media may contain computer-executable instructions for implementing one or more parts of embodiments shown and described herein.

A number of program modules may be stored in drives and ROM 510, including operating system 532, one or more application programs 534, other program modules 536, and program data 538. In some examples, the application programs 534 can include the valve control module 312 and the inert gas flow control module 314, and the program data 538 can include readings from the one or more sensors 132, images/videos from the camera 124, and remote control information for the conveyors 112. The application programs 534 and program data 538 can include functions and methods programmed to perform and monitor back purging operations within a piping circuit 102 such as shown and described herein.

A user may enter commands and information into computer system 500 through one or more input devices 540, such as a pointing device (e.g., a mouse, touch screen), keyboard, microphone, joystick, game pad, scanner, and the like. For instance, the user can employ input device 540 to edit or modify the path of the robotic crawler 100, the angle of the camera 124, or the flow rate of the inert gas. These and other input devices 540 are often connected to processing unit 502 through a corresponding port interface 542 that is coupled to the system bus, but may be connected by other interfaces, such as a parallel port, serial port, or universal serial bus (USB). One or more output devices 544 (e.g., display, a monitor, printer, projector, or other type of displaying device) is also connected to system bus 506 via interface 546, such as a video adapter.

Computer system 500 may operate in a networked environment using logical connections to one or more remote computers, such as remote computer 548. Remote computer 548 may be a workstation, computer system, router, peer device, or other common network node, and typically includes many or all the elements described relative to computer system 500. The logical connections, schematically indicated at 550, can include a local area network (LAN) and/or a wide area network (WAN), or a combination of these, and can be in a cloud-type architecture, for example configured as private clouds, public clouds, hybrid clouds, and multi-clouds. When used in a LAN networking environment, computer system 500 can be connected to the local network through a network interface or adapter 552. When used in a WAN networking environment, computer system 500 can include a modem, or can be connected to a communications server on the LAN. The modem, which may be internal or external, can be connected to system bus 506 via an appropriate port interface. In a networked environment, application programs 534 or program data 538 depicted relative to computer system 500, or portions thereof, may be stored in a remote memory storage device 554.

Embodiments disclosed herein include:

A. A system comprising: a robotic crawler for back purging a weld location in a piping circuit, the robotic crawler including: a body, one or more conveyors coupled to the body for transporting the robotic crawler within the piping circuit, first and second seal assemblies configured to generate an interference seal with an interior of the piping circuit, a pair of extendable arms, each extendable arm supporting a respective one of the first and second seal assemblies on an opposite side of the body, each respective extendable arm selectively extendable and retractable with respect to the body to adjust a position of the respective seal assembly with respect to the body, an inert gas flow valve for providing an inert gas into a sealed area defined between the first and second seal assemblies, a memory storing thereon one or more modules for instructing the one or more conveyors, the pair of extendable arms, the inert gas flow valve, or a combination thereof, and a controller configured to receive instructions from one or more modules of the memory to operate the one or more conveyors, the pair of extendable arms and the inert gas flow valve to control back purging at the weld location.

B. A method comprising: conveying a robotic crawler, via conveyors of the robotic crawler, through a piping circuit and towards a weld location, extending, via one or more arm actuators, a pair of extendable arms of the robotic crawler from a body of the robotic crawler, each extendable arm supporting a respective one of a first and second seal assemblies on an opposite side of the body of the robotic crawler, generating an interference seal within an interior of the piping circuit, via the first and second seal assemblies of the robotic crawler, introducing, via an inert gas flow valve, an inert gas into a sealed area defined between the first and second seal assemblies, releasing, via an oxygen release valve, oxygenated air from the sealed area into a remainder of the piping circuit, and welding an exterior of the piping circuit while the interior of the piping circuit at the weld location is shielded by the inert gas.

C. A robotic crawler for back purging a weld location in a piping circuit, the robotic crawler comprising: a body, one or more conveyors coupled to the body for transporting the robotic crawler within the piping circuit, first and second seal assemblies configured to generate an interference seal with an interior of the piping circuit, a pair of extendable arms, each extendable arm supporting a respective one of the first and second seal assemblies on an opposite side of the body, each respective extendable arm selectively extendable and retractable with respect to the body to adjust a position of the respective seal assembly with respect to the body, and an inert gas flow valve for providing an inert gas into a sealed area defined between the first and second seal assemblies.

Each of embodiments A through C may have one or more of the following additional elements in any combination: Element 1: wherein each of the first and second seal assemblies includes an inflatable seal member formed of an elastic material for generating the interference seal. Element 2: wherein the robotic crawler further includes a camera integrated into the body. Element 3: wherein the robotic crawler includes one or more sensors configured to monitor an oxygen concentration within the sealed area. Element 4: wherein the conveyors are selected from the group consisting of motorized wheels, track and wheel sets, actuatable leg pairs, and a combination thereof. Element 5: further comprising a gas delivery tube within the piping circuit and in fluid communication with the robotic crawler. Element 6: further comprising one or more wireless modules for communication between the robotic crawler and an external computing device. Element 7: wherein the memory and the controller are components of the external computing device, and wherein the external computing device is operable by an operator to control the robotic crawler. Element 8: further comprising a display in communication with the external computing device.

Element 9: further comprising inflating an inflatable seal member of each of the first and second seal assemblies to generate the interference seal. Element 10: wherein the inflatable seal members of each of the first and second seal assemblies are inflated with the inert gas. Element 11: further comprising inspecting, via a camera integrated into the body of the robotic crawler, a quality of a heat-affected zone and an internal weld bead generated while welding the exterior of the piping circuit. Element 12: further comprising monitoring, via one or more sensors of the robotic crawler, an oxygen concentration within the sealed area. Element 13: further comprising: communicating, via one or more wireless modules, the oxygen concentration to an external computing device; and receiving instructions for controlling the inert gas flow valve, the oxygen release valve, the conveyors, the arm actuators, or a combination thereof from one or more modules of the external computing device. Element 14: further comprising conveying the robotic crawler to a subsequent weld location. Element 15: further comprising returning the robotic crawler to an entrance of the piping circuit for extraction. Element 16: further comprising one or more arm actuators coupled to the extendable arms and operable to extend and retract each of the extendable arms. Element 17: further comprising a 360° camera integrated into the body of the robotic crawler.

By way of non-limiting example, exemplary combinations applicable to A through C include: Element 6 with Element 7; Element 7 with Element 8; Element 9 with Element 10; and Element 12 with Element 13.

The terminology used herein is for the purpose of describing particular embodiments only and is not intended to be limiting of the invention. As used herein, for example, the singular forms "a," "an," and "the" are intended to include the plural forms as well, unless the context clearly indicates otherwise. It will be further understood that the terms "contains", "containing", "includes", "including," "comprises", and/or "comprising," and variations thereof, when used in this specification, specify the presence of stated features, integers, steps, operations, elements, and/or components, but do not preclude the presence or addition of one or more other features, integers, steps, operations, elements, components, and/or groups thereof.

Terms of orientation used herein are merely for purposes of convention and referencing and are not to be construed as limiting. However, it is recognized these terms could be used with reference to an operator or user. Accordingly, no limitations are implied or to be inferred. In addition, the use of ordinal numbers (e.g., first, second, third, etc.) is for distinction and not counting. For example, the use of "third" does not imply there must be a corresponding "first" or "second." Also, if used herein, the terms "coupled" or "coupled to" or "connected" or "connected to" or "attached" or "attached to" may indicate establishing either a direct or indirect connection, and is not limited to either unless expressly referenced as such.

While the disclosure has described several exemplary embodiments, it will be understood by those skilled in the art that various changes can be made, and equivalents can be substituted for elements thereof, without departing from the spirit and scope of the invention. In addition, many modifications will be appreciated by those skilled in the art to adapt a particular instrument, situation, or material to embodiments of the disclosure without departing from the essential scope thereof. Therefore, it is intended that the invention not be limited to the particular embodiments disclosed, or to the best mode contemplated for carrying out this invention, but that the invention will include all embodiments falling within the scope of the appended claims. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

The invention claimed is:

1. A system, comprising:

a robotic crawler for back purging a weld location in a piping circuit, the robotic crawler including:

a body;

one or more conveyors coupled to the body for transporting the robotic crawler longitudinally within the piping circuit;

first and second seal assemblies configured to generate an interference seal with an interior of the piping circuit;

a pair of extendable arms, each extendable arm supporting a respective one of the first and second seal assemblies on an opposite side of the body, each respective extendable arm selectively longitudinally extendable away from the body and longitudinally retractable toward the body to adjust a position of the respective seal assembly with respect to the body;

an inert gas flow valve for providing an inert gas into a sealed area defined between the first and second seal assemblies;

a memory storing thereon one or more modules for instructing the one or more conveyors, the pair of extendable arms, the inert gas flow valve, or a combination thereof; and a controller configured to receive instructions from one or more modules of the memory to operate the one or more conveyors, the pair of extendable arms and the inert gas flow valve to control back purging at the weld location.

2. The system of claim 1, wherein each of the first and second seal assemblies includes an inflatable seal member formed of an elastic material for generating the interference seal.

3. The system of claim 1, wherein the robotic crawler further includes a camera integrated into the body.

4. The system of claim 1, wherein the robotic crawler further includes one or more sensors configured to monitor an oxygen concentration within the sealed area.

5. The system of claim 1, wherein the conveyors are selected from the group consisting of motorized wheels, track and wheel sets, actuatable leg pairs, and any combination thereof.

6. The system of claim 1, further comprising a gas delivery tube within the piping circuit and in fluid communication with the robotic crawler.

7. The system of claim 1, further comprising one or more wireless modules for communication between the robotic crawler and an external computing device.

8. The system of claim 7, wherein the memory and the controller are components of the external computing device, and wherein the external computing device is operable by an operator to control the robotic crawler.

9. The system of claim 8, further comprising a display in communication with the external computing device.

10. A method, comprising:

conveying a robotic crawler, via conveyors of the robotic crawler, longitudinally through a piping circuit and towards a weld location;

extending, via one or more arm actuators, a pair of extendable arms of the robotic crawler longitudinally away from a body of the robotic crawler, each extendable arm supporting a respective one of first and second seal assemblies spaced longitudinally away from the body on an opposite side of the body of the robotic crawler;

generating an interference seal within an interior of the piping circuit, via the first and second seal assemblies of the robotic crawler;

introducing, via an inert gas flow valve, an inert gas into a sealed area defined between the first and second seal assemblies;

releasing, via an oxygen release valve, oxygenated air from the sealed area into a remainder of the piping circuit; and welding an exterior of the piping circuit while the interior of the piping circuit at the weld location is shielded by the inert gas.

11. The method of claim 10, further comprising inflating an inflatable seal member of each of the first and second seal assemblies to generate the interference seal.

12. The method of claim 11, wherein the inflatable seal member of each of the first and second seal assemblies is inflated with the inert gas.

13. The method of claim 10, further comprising inspecting, via a camera integrated into the body of the robotic crawler, a quality of a heat-affected zone and an internal weld bead generated while welding the exterior of the piping circuit.

14. The method of claim 10, further comprising monitoring, via one or more sensors of the robotic crawler, an oxygen concentration within the sealed area.

15. The method of claim 14, further comprising:

communicating, via one or more wireless modules, the oxygen concentration to an external computing device; and receiving instructions for controlling the inert gas flow valve, the oxygen release valve, the conveyors, the arm actuators, or a combination thereof from one or more modules of the external computing device.

16. The method of claim 10, further comprising conveying the robotic crawler to a subsequent weld location.

17. The method of claim 10, further comprising returning the robotic crawler to an entrance of the piping circuit for extraction.

18. A robotic crawler for back purging a weld location in a piping circuit, the robotic crawler comprising:

a body;

one or more conveyors coupled to the body for transporting the robotic crawler longitudinally within the piping circuit;

first and second seal assemblies configured to generate an interference seal with an interior of the piping circuit;

a pair of extendable arms, each extendable arm supporting a respective one of the first and second seal assemblies spaced longitudinally away from the body on an opposite side of the body, each respective extendable arm selectively extendable away from the body and retractable toward the body in a longitudinal direction with respect to the body to adjust a position of the respective seal assembly with respect to the body; and an inert gas flow valve for providing an inert gas into a sealed area defined between the first and second seal assemblies.

19. The robotic crawler of claim 18, further comprising one or more arm actuators coupled to the extendable arms and operable to extend and retract each of the extendable arms.

20. The robotic crawler of claim 18, further comprising a 360° camera integrated into the body of the robotic crawler.

\*    \*    \*    \*    \*